(12) United States Patent
Son et al.

(10) Patent No.: US 12,218,332 B2
(45) Date of Patent: Feb. 4, 2025

(54) BATTERY PACK COMPRISING HEAT DIFFUSION PREVENTING MEMBER

(71) Applicant: LG ENERGY SOLUTION, LTD., Seoul (KR)

(72) Inventors: Chang Keun Son, Daejeon (KR); Sang Yoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 524 days.

(21) Appl. No.: 17/635,269

(22) PCT Filed: Nov. 18, 2020

(86) PCT No.: PCT/KR2020/016213
§ 371 (c)(1),
(2) Date: Feb. 14, 2022

(87) PCT Pub. No.: WO2021/112453
PCT Pub. Date: Jun. 10, 2021

(65) Prior Publication Data
US 2022/0294045 A1     Sep. 15, 2022

(30) Foreign Application Priority Data

Dec. 5, 2019   (KR) ................ 10-2019-0160872

(51) Int. Cl.
*H01M 10/658*    (2014.01)
*H01M 10/613*    (2014.01)
(Continued)

(52) U.S. Cl.
CPC ....... *H01M 10/658* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS 2,939,901 A * 6/1960 Schultz ............... H01M 50/289
429/100
2011/0195284 A1    8/2011 Yasui et al.
(Continued)

FOREIGN PATENT DOCUMENTS

CN         103009688 A     4/2013
CN         103681894 A     3/2014
(Continued)

OTHER PUBLICATIONS

Machine translation of WO 2017/098838, published on Jun. 15, 2017 (Year: 2017).*

(Continued)

*Primary Examiner* — Anca Eoff
(74) *Attorney, Agent, or Firm* — Birch, Stewart, Kolasch & Birch, LLP

(57) ABSTRACT

A battery pack includes a heat diffusion preventing member. The battery pack can effectively prevent the diffusion of heat or fire generated in any one battery module from among battery modules accommodated in the battery pack, and can have various applications such as vehicles or power storage devices.

14 Claims, 5 Drawing Sheets

(51) Int. Cl.
  *H01M 10/625* (2014.01)
  *H01M 10/627* (2014.01)
  *H01M 50/204* (2021.01)
  *H01M 50/249* (2021.01)
  *H01M 50/251* (2021.01)
  *H01M 50/258* (2021.01)
  *H01M 50/505* (2021.01)

(52) U.S. Cl.
  CPC ....... *H01M 10/627* (2015.04); *H01M 50/204* (2021.01); *H01M 50/249* (2021.01); *H01M 50/251* (2021.01); *H01M 50/258* (2021.01); *H01M 50/505* (2021.01); *H01M 2220/10* (2013.01); *H01M 2220/20* (2013.01)

(56) References Cited

U.S. PATENT DOCUMENTS

| | | |
|---|---|---|
| 2012/0009461 A1 | 1/2012 | Kim et al. |
| 2013/0029540 A1 | 1/2013 | Tong et al. |
| 2013/0240021 A1 | 9/2013 | Mu et al. |
| 2014/0069479 A1 | 3/2014 | Yang et al. |
| 2014/0220414 A1 | 8/2014 | Lee et al. |
| 2015/0221921 A1 | 8/2015 | Choi et al. |
| 2015/0380699 A1 | 12/2015 | Ikeda et al. |
| 2016/0093845 A1 * | 3/2016 | DeKeuster ............ H01M 4/525 429/99 |
| 2017/0125774 A1 | 5/2017 | Choi et al. |
| 2018/0175467 A1 | 6/2018 | Schmid-Schoenbein et al. |
| 2018/0309107 A1 | 10/2018 | Widener |
| 2018/0309281 A1 | 10/2018 | Ichikawa et al. |
| 2019/0181405 A1 | 6/2019 | Kim et al. |
| 2019/0190055 A1 | 6/2019 | Fang et al. |
| 2019/0221901 A1 | 7/2019 | Yoon et al. |
| 2019/0305270 A1 | 10/2019 | Chi et al. |
| 2020/0044213 A1 | 2/2020 | Park et al. |

FOREIGN PATENT DOCUMENTS

| | | | |
|---|---|---|---|
| CN | 103972432 A | 8/2014 | |
| CN | 104821385 A | 8/2015 | |
| CN | 105074958 A | 11/2015 | |
| CN | 106299503 A | 1/2017 | |
| CN | 205944176 U | 2/2017 | |
| CN | 206849989 U | 1/2018 | |
| CN | 108448026 A | 8/2018 | |
| CN | 108630847 A | 10/2018 | |
| CN | 109037844 A | 12/2018 | |
| CN | 208298972 U | 12/2018 | |
| CN | 208904109 U | 5/2019 | |
| CN | 209071388 U | 7/2019 | |
| CN | 213845431 U | 7/2021 | |
| EP | 2571078 A2 * | 3/2013 | .......... H01M 2/1077 |
| EP | 4 002 562 A1 | 5/2022 | |
| JP | 2008-251471 A | 10/2008 | |
| JP | 2011-238521 A | 11/2011 | |
| JP | 2013-26226 A | 2/2013 | |
| JP | 5301522 B2 | 9/2013 | |
| JP | 5902811 B2 | 4/2016 | |
| JP | 2018-181780 A | 11/2018 | |
| JP | 6612893 B2 | 11/2019 | |
| KR | 10-2011-0059796 A | 6/2011 | |
| KR | 10-2014-0099398 A | 8/2014 | |
| KR | 10-2016-0142171 A | 12/2016 | |
| KR | 10-2017-0139305 A | 12/2017 | |
| KR | 10-1821378 B1 | 1/2018 | |
| KR | 10-2018-0105465 A | 9/2018 | |
| KR | 10-1911662 B1 | 10/2018 | |
| KR | 10-2019-0000210 A | 1/2019 | |
| KR | 10-2019-0000211 A | 1/2019 | |
| KR | 10-2019-0069873 A | 6/2019 | |
| KR | 10-2019-0074154 A | 6/2019 | |
| WO | WO 2017/098838 A1 | 10/2024 | |

OTHER PUBLICATIONS

International Search Report for PCT/KR2020/016213 mailed on Mar. 4, 2021.

Extended European Search Report for European Application No. 20897190.3, dated Feb. 14, 2023.

\* cited by examiner

[FIG. 1]
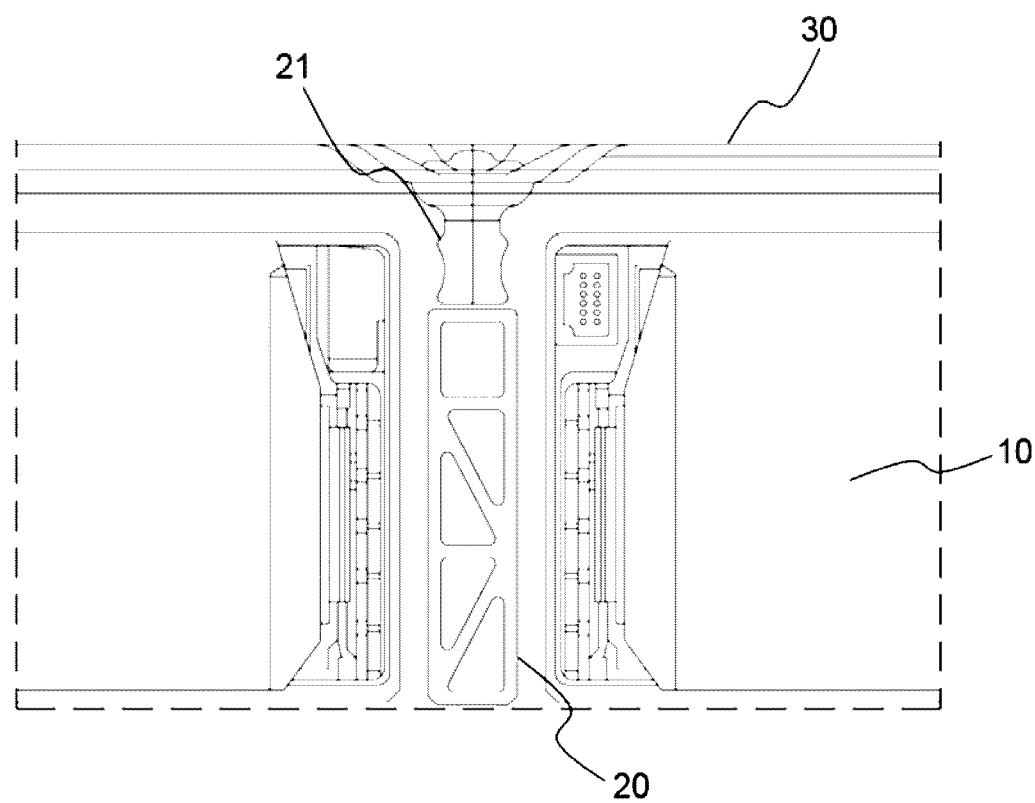
Conventional Art

【FIG. 2】
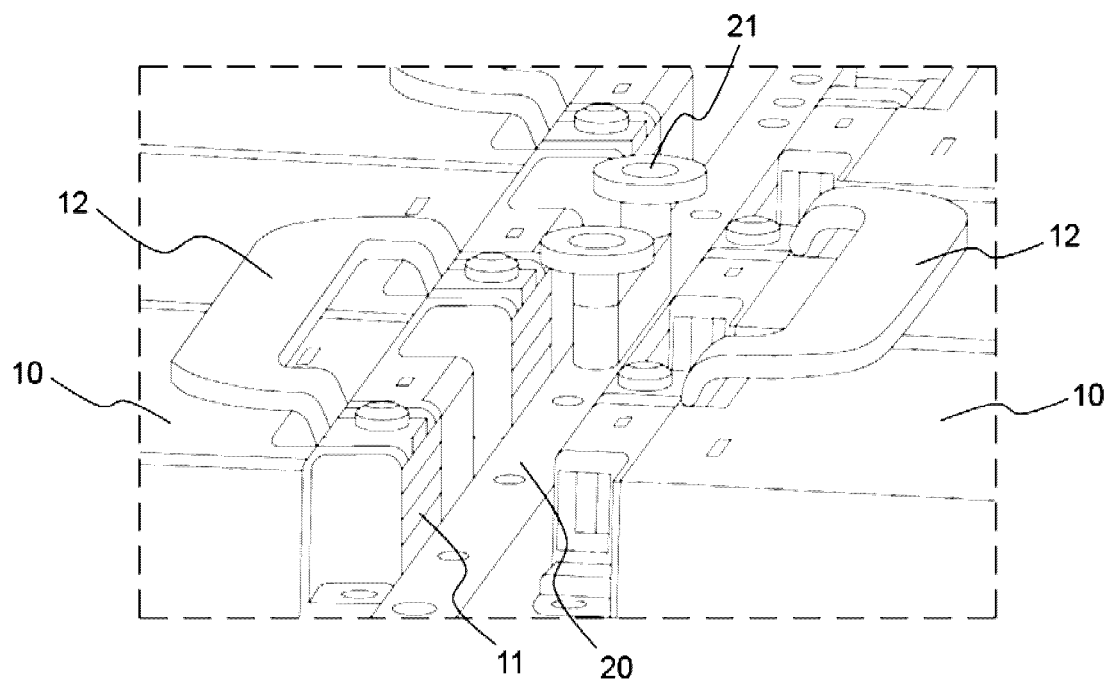
Conventional Art

[FIG. 3]
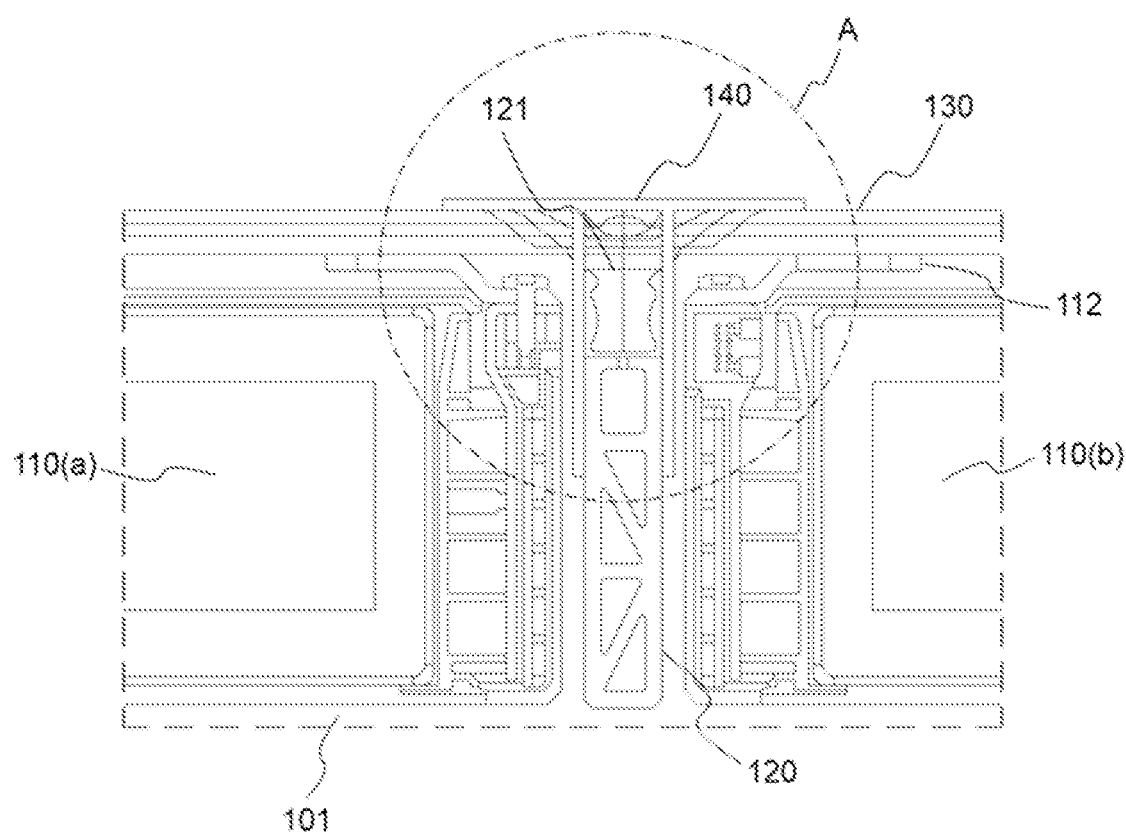

[FIG. 4]
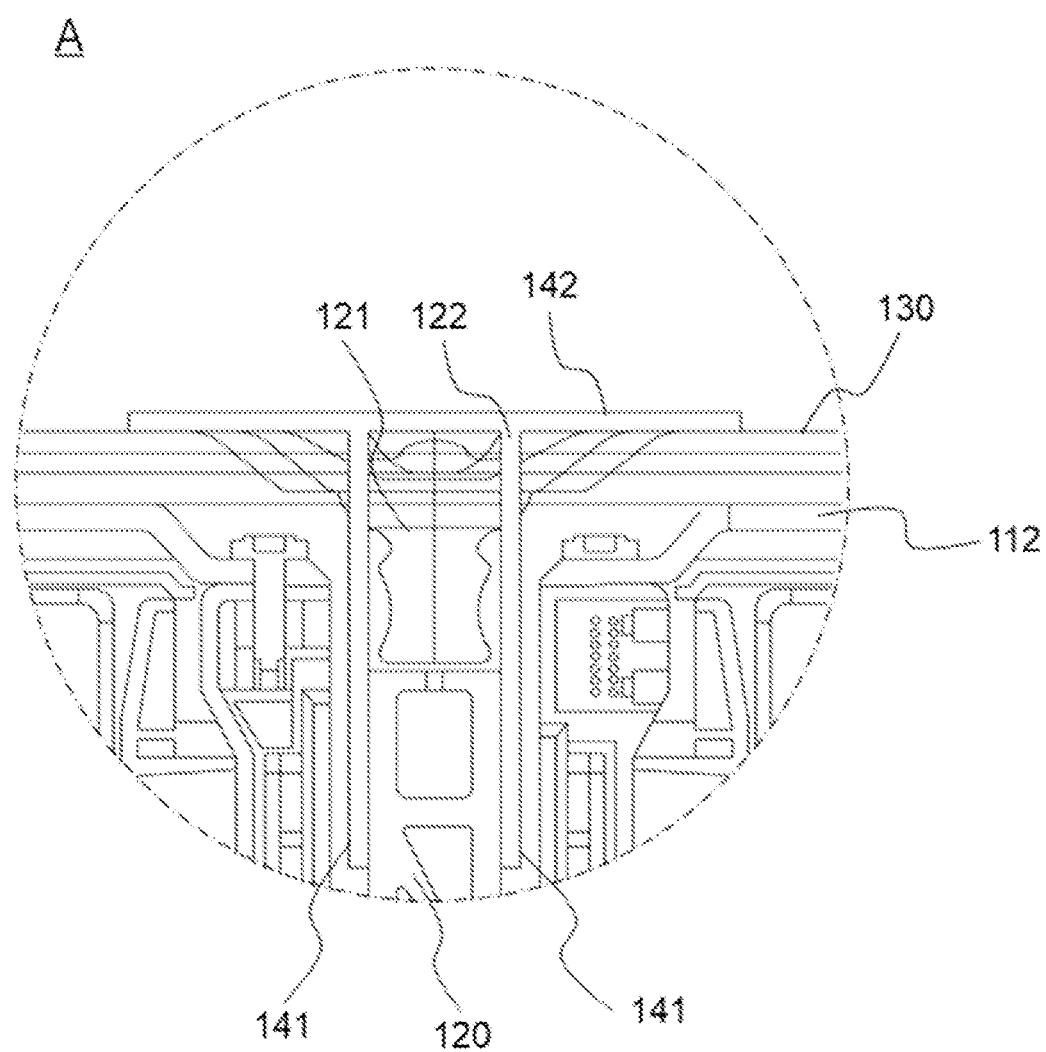

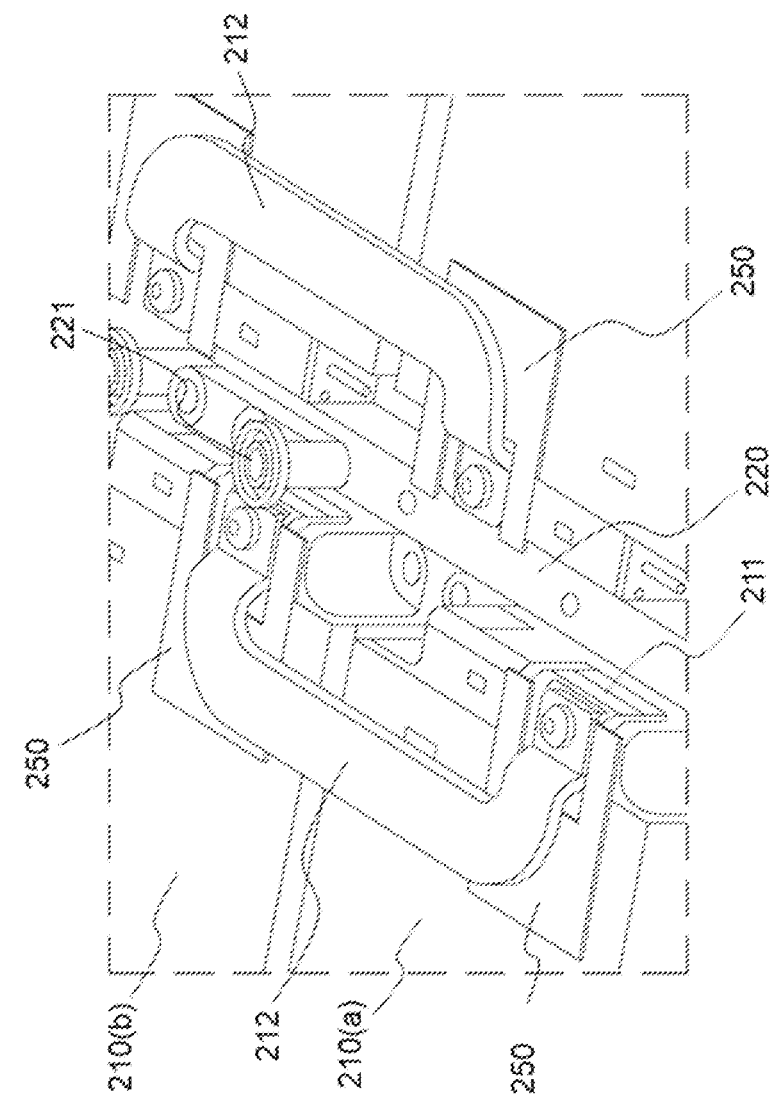

BATTERY PACK COMPRISING HEAT DIFFUSION PREVENTING MEMBER

TECHNICAL FIELD

This application claims the benefit of priority based on Korean Patent Application No. 10-2019-0160872 filed on Dec. 5, 2019, and the entire contents of the Korean patent application are incorporated herein by reference.

The present invention relates to a battery pack including a heat diffusion preventing member.

BACKGROUND TECHNOLOGY OF THE INVENTION

With the increase in technology development and demand for mobile devices, the demand for secondary batteries is also rapidly increasing. Among them, lithium secondary batteries are widely used as an energy source for various electronic products as well as various mobile devices because of their high energy density and high operating voltage and excellent storage and lifetime characteristics.

As the field of application for secondary batteries expands, the demand for higher-capacity secondary batteries is increasing rapidly. As a method of providing a high-capacity secondary battery, it is possible to form a battery module or battery pack in which a plurality of unit cells is assembled.

FIG. 1 is a schematic diagram showing a cross-sectional structure of a conventional battery pack. Referring to FIG. 1, the battery pack has a structure in which a plurality of battery modules 10 are combined. Specifically, the battery pack includes compartments divided by a vertical beam 20 and includes a pack receiving portion having an open top surface, a battery module 10 accommodated in divided compartments of the pack receiving portion, and a lead assembly 30 covering an upper surface of the pack receiving portion. In addition, the upper portion of the vertical beam 20 is an empty space, and support bolts 21 are formed at regular intervals to support the lead assembly 30.

When heat or fire occurs in any one battery module in the battery pack, an explosion may occur as heat or flame is transferred from an HV terminal of the battery module, in which the fire occurred, to another battery module adjacent thereto. In the case of the battery pack shown in FIG. 1, although the pack receiving portion is partitioned by the vertical beam 20, a separate partition wall is not formed at the upper end of the vertical beam 20. Heat or flame may spread to adjacent battery modules through this empty space.

In addition, FIG. 2 is a perspective view showing an upper portion of a battery pack before a lead assembly is fastened. Referring to FIG. 2, a conventional battery pack has a structure in which a battery module 10 is accommodated in a pack receiving portion partitioned by a vertical beam 20. Support bolts 21 are formed on the upper end of the vertical beam 20 at regular intervals. In addition, an electrode lead 11, to which electrode tabs of unit cells are electrically connected, protrudes at one side of each battery module 10. The electrode lead 11 has a structure connected to a bus bar 12 at the upper end. The bus bar 12 is an inter bus bar that electrically connects the battery modules 10. Specifically, both ends of the bus bar 12 are electrically connected to respective electrode leads 11 of two battery modules 10. The bus bar 12 has a structure protruding and bent toward the upper end of the battery module 10. When the battery module 10 contained in the battery pack is ignited, as a potential difference between the potential applied from the ignited battery module 10 to another battery module by the module frame and the potential applied to the bus bar through a high voltage terminal from a secondary battery inside the module increases, there is a risk of sparking or further ignition of adjacent battery modules.

Accordingly, there is a need for a technology for securing safety when the module is fired is recognized, such as preventing the occurrence of fire or effectively blocking the spread of the fire in a battery module or a battery pack.

DESCRIPTION OF THE INVENTION

Technical Problem

The present invention is invented to solve the above problems, and an object of the present invention is to provide a battery pack including a heat diffusion preventing member, a vehicle including the same, and a power storage device so as to ensure safety when a battery module in the battery pack ignites.

Technical Solution

In one example, a battery pack according to the present invention includes: a pack receiving portion including a plurality of compartments divided by a vertical beam, and having an open top surface; a battery module accommodated in each compartment of the pack receiving portion; a lead assembly covering a top surface of the pack receiving portion and having a slit formed in an area corresponding to an upper end of the vertical beam; and a heat diffusion preventing member inserted into the slit of the lead assembly and mounted on the upper end of the vertical beam.

In a specific example, the heat diffusion preventing member may include a vertical body mounted on the upper end of the vertical beam; and a horizontal body formed on an upper end of the vertical body and formed with an area larger than the slit formed in the lead assembly.

For example, the vertical body may include two plate-shaped members parallel to each other, and an upper end of the vertical beam may be inserted between the two plate-shaped members.

In one example, a height of the vertical beam may be in a range of 50 to 80% of a height of the battery module accommodated in the pack receiving portion. Further, the heat diffusion preventing member may extend from the upper end of the vertical beam to shield a spaced distance to the lead assembly.

In one example, the heat diffusion preventing member may be formed of a silicate-containing inorganic material.

In a specific example, the heat diffusion preventing member may be formed of a component represented by Chemical Formula 1 below.

$$X_2Y_{4-6}Z_8O_{20}(OH,F)_4 \qquad \text{Chemical formula 1}$$

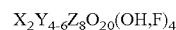

where, in the above chemical formula 1,
X is at least one of K, Na and Ca;
Y is at least one of Al, Mg and Fe; and
Z is at least one of Si and Al.

For example, the heat diffusion preventing member may be formed of a mica sheet.

In yet another example, each battery module may include: a plurality of battery cells in which electrode tabs are oriented in one direction; a module frame in which the plurality of battery cells are accommodated; and a bus bar electrically connected to the electrode tabs and extending and protruding outward of the module frame.

In a specific example, the battery module may further include an electrode lead, and a first end of the electrode lead may be connected to the electrode tabs, and a second end may be connected to a bus bar.

In one example, the bus bar may have a bent portion extending over a top of the module frame, and a silicate-containing inorganic sheet may be positioned between an upper surface of the battery module and the bent portion of the bus bar.

In a specific example, the bus bar may be an inter bus bar that electrically connects adjacent battery modules.

The silicate-containing inorganic sheet may be a mica sheet.

In addition, the present invention may provide a vehicle including the battery pack described above.

In addition, the present invention may provide a power storage device including the battery pack described above.

Advantageous Effects

The battery pack according to the present invention can effectively block the spread of heat or fire generated from a specific battery module, and can be variously applied to automobiles or power storage devices.

BRIEF DESCRIPTION OF THE DRAWINGS

FIG. 1 is a schematic diagram showing a cross-sectional structure of a conventional battery pack.

FIG. 2 is a perspective view showing an upper portion of a battery pack before a lead assembly is fastened.

FIG. 3 is a schematic diagram showing a cross-sectional structure of a battery pack according to an embodiment of the present invention.

FIG. 4 is an enlarged view showing part A of FIG. 3.

FIG. 5 is a perspective view illustrating an upper portion of a battery pack according to another embodiment of the present invention, and illustrates a state before a lead assembly is fastened.

BEST MODE FOR CARRYING OUT THE INVENTION

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In one embodiment, the present invention relates to a battery pack and the battery pack includes: a pack receiving portion including a plurality of compartments divided by vertical beams, and having an open top surface; a battery module accommodated in each divided compartment of the pack receiving portion; a lead assembly covering a top surface of the pack receiving portion and having a slit formed in an area corresponding to an upper end of the vertical beam; and a heat diffusion preventing member inserted into the slit of the lead assembly and mounted on the upper end of the vertical beam.

The battery pack includes a plurality of battery modules. The battery pack divides the compartment of the pack receiving portion through a vertical beam. However, the vertical beam has a structure formed only from the bottom surface of the pack receiving portion to a predetermined height. In addition, support bolts are formed at regular intervals on the upper end of the vertical beam, and the lead assembly is supported by the support bolts. Accordingly, a blank area, in which no separate partition walls are formed, is formed between the upper portion of the vertical beam and the lower portion of the lead assembly. This is for the efficiency of the assembly process of the battery pack and the ease of maintenance.

However, in the case that heat or fire occurs in any one of the plurality of battery modules housed in the battery pack, as heat or flame is transferred to another adjacent battery module through the empty area between the upper part of the vertical beam and the lower part of the lead assembly described above, the range of fire may increase and an explosion may occur. Specifically, when any one battery module in the battery pack is ignited, another battery module adjacent thereto is damaged by a flame emitted from the high voltage terminal (HV terminal) of the battery module, resulting in a chain fire phenomenon in a short time. In the present invention, a heat diffusion preventing member is provided for shielding an empty area between an upper portion of the vertical beam and a lower portion of a lead assembly. The heat diffusion preventing member is mounted through a slit formed in a lead assembly after primary packaging for accommodating a battery module in a battery pack is performed. Accordingly, the heat diffusion preventing member does not impair the efficiency of a packaging process for manufacturing a battery pack, and can be detached if necessary.

In one embodiment, the heat diffusion preventing member includes a vertical body and a horizontal body. Specifically, the heat diffusion preventing member may include a vertical body mounted on an upper end of the vertical beam; and a horizontal body formed on the upper end of the vertical body and formed in a larger area than the slit formed in the lead assembly.

The vertical body is mounted on the upper end of the vertical beam and serves to fix the lower portion of the heat diffusion preventing member, and shields a space between the upper portion of the vertical beam and the lower portion of the lead assembly. In addition, the horizontal body serves to fix the upper portion of the heat diffusion preventing member and, if necessary, serves to shield the slit formed in the lead assembly.

In the heat diffusion preventing member, the shape of the vertical body is not particularly limited as long as it can form a partition wall connecting the upper portion of the vertical beam and the lower portion of the lead assembly while being mounted on the upper end of the vertical beam. In a specific embodiment, in the heat diffusion preventing member, the vertical body includes two plate-shaped members parallel to each other, and an upper end of the vertical beam is inserted between the two plate-shaped members. That is, one end of the vertical body is mounted on the top of the vertical beam.

In addition, the plate-shaped member may have a sheet shape. In this case, one end of the vertical body may be mounted on the upper end of the vertical beam, and the other end may be inserted between the slits. One end of the vertical body inserted between the slits may be bent and attached to the lead assembly by bending a portion extending to the outside of the lead assembly through the slits to fix the lead assembly. In this case, the vertical body may be stably fixed to the lead assembly by the horizontal body covering the slit.

The height of the vertical beam is in a range of 50 to 80% of a height of the battery module accommodated in the pack receiving portion, and the heat diffusion preventing member, in a state mounted on the upper end of the vertical beam, extends from the upper end of the vertical beam to shield a spaced distance to the lead assembly. That is, as described above, by installing a heat diffusion preventing member between the high voltage terminals of the module, it is possible to shield the flame from spreading to other modules when a fire occurs.

In one embodiment, the heat diffusion preventing member is formed of a silicate-containing inorganic material. In the present invention, by forming the heat diffusion preventing member of a silicate-containing inorganic material, it is possible to impart flame retardant or non-flammable properties and block the spread of flame.

In a specific embodiment, the heat diffusion preventing member is formed of a component represented by Chemical Formula 1 below.

$$X_2Y_{4-6}Z_8O_{20}(OH,F)_4 \qquad \text{Chemical formula 1}$$

where, in the above chemical formula 1,
X is at least one of K, Na and Ca;
Y is at least one of Al, Mg and Fe; and
Z is at least one of Si and Al.

In more detail, the heat diffusion preventing member may be a mica sheet.

In yet another embodiment, the battery module includes: a plurality of battery cells in which electrode tabs are oriented in one direction; a module frame in which the battery cells are accommodated; and a bus bar electrically connected to the electrode tabs and extending and protruding outward of the module frame. Specifically, the battery module further includes an electrode lead, and one end of the electrode lead is connected to an electrode tab, and the other end is connected to a bus bar. That is, the electrode leads to which the electrode tabs inside the battery cell are connected are electrically connected through the bus bar. The electrode lead and the bus bar form a high voltage terminal portion.

In one embodiment, the bus bar has a structure protruding and bent to an upper end of the module frame, and the battery module includes a silicate-containing inorganic sheet positioned between an upper surface of the battery module and a bent portion of the bus bar. More specifically, the silicate-containing inorganic sheet may be a mica sheet.

In a specific embodiment, the bus bar is an inter bus bar that electrically connects adjacent battery modules. That is, the bus bar has a structure that is connected by protruding and bending to the top of each adjacent battery module frame. In this case, it includes a silicate-containing inorganic sheet positioned between the upper surface of each battery module and the bent portion of the bus bar. In this case, the adjacent battery module refers to a pair of battery modules continuously arranged in the same compartment among the compartments divided by the vertical beam.

In the present invention, by forming a silicate-containing inorganic sheet positioned between the top surface of the battery module and the bent portion of the bus bar, static electricity or sparks are prevented in the corresponding portion. This is because the potential difference between the potential applied from the ignited battery module to another battery module by the module frame and the potential applied from the secondary battery inside the module to the inter bus bar through the high voltage terminal is large. By attaching a silicate-containing inorganic sheet between the top surface of the battery module and the bent portion of the bus bar, insulation between the bus bar and the module case can be secured, and safety of the battery module can be ensured.

The silicate-containing inorganic sheet has, for example, a plate-shaped structure and may have a shape surrounding a bus bar. Specifically, a groove is formed on one side of the sheet or a through hole is formed in the center of the sheet. The silicate-containing inorganic sheet can implement stable fastening and effective insulation range by being installed on the battery module while placing the groove of the silicate-containing inorganic sheet toward the protruding part of the bus bar so that it can surround the bus bar at the connection part between the module and the bus bar.

In addition, the present invention provides a vehicle including the battery pack described above. For example, the vehicle is a hybrid or electric vehicle. The battery pack according to the present invention can effectively block the occurrence or spread of fire by implementing high output.

The present invention provides a power storage device including a battery pack including the battery pack described above. In the case of a large-capacity power storage device, a safety device capable of lowering the risk of fire or explosion as well as stable power storage performance is required. The battery pack according to the present invention can effectively block the occurrence or spread of fire without impairing the performance of the battery pack.

Hereinafter, the present invention will be described in more detail through drawings and the like.

First Embodiment

FIG. 3 is a schematic diagram showing a cross-sectional structure of a battery pack according to an embodiment of the present invention, and FIG. 4 is an enlarged view showing part A of FIG. 3. Referring to FIGS. 3 and 4, a battery pack according to the present invention includes: a pack receiving portion 101 including a plurality of compartments divided by vertical beams 120, and having an open top surface; a battery module 110(a) or 110(b) accommodated in each divided compartment of the pack receiving portion; a lead assembly 130 covering a top surface of the pack receiving portion and having a slit 122 formed in an area corresponding to an upper end of the vertical beam 120; and a heat diffusion preventing member 140 inserted into the slit 122 of the lead assembly 130 and mounted on the upper end of the vertical beam 120. A bus bar 112 having a structure protruding and bent to the top of the module frame to be connected is formed at the ends of the battery modules 110(a) and 110(b).

In addition, the upper end of the vertical beam 120 is an empty space, and support bolts 121 are formed at regular intervals to support the lead assembly 130. When the heat diffusion preventing member 140 is mounted on the upper end of the vertical beam 120, the heat diffusion preventing member 140 extends from the upper end of the vertical beam 120 to shield the distance to the lead assembly 130. Through this, when any one of the battery modules in the battery pack is ignited, flames emitted from the terminal of the ignited battery module are diffused away from the other battery modules to thereby prevent the phenomenon of chain fire.

The heat diffusion preventing member 140 has a structure including a vertical body 141 mounted on the top of the vertical beam, and a horizontal body 142 formed on the upper end of the vertical body 141 and formed with a larger area than the slit 122 formed in the lead assembly 130. The vertical body 141 is mounted on the upper end of the vertical beam 120 and serves to fix the lower portion of the heat diffusion preventing member, and shields a space between the upper portion of the vertical beam 120 and the lower portion of the lead assembly 130. The horizontal body 142 may stably fix the vertical body by covering the slit and block flames from the slit. The vertical body 141 and the horizontal body 142 forming the heat diffusion preventing member are formed of mica sheets.

The vertical body 141 includes two plate-shaped members parallel to each other, and an upper end of the vertical beam 120 is inserted between the two plate-shaped members. The height of the vertical beam 120 is about 70% of the height of the battery modules 110(a) and 110(b) accommodated in the pack receiving portion. The vertical body 141 extends from the upper end of the vertical beam 120 and is located within a spaced distance to the lead assembly 130, and shields a space between the battery modules 110(a) and 110(b) facing each other with the vertical beam interposed therebetween.

Second Embodiment

FIG. 5 is a perspective view illustrating an upper portion of a battery pack according to an exemplary embodiment of the present invention, and illustrating an upper portion of the battery pack before the lead assembly is fastened. Referring to FIG. 5, the battery pack according to the present invention has a structure in which battery modules 210(a) and 210(b) are accommodated in a pack receiving portion partitioned by a vertical beam 220. Support bolts 221 are formed on the upper end of the vertical beam 220 at regular intervals. In addition, an electrode lead 211, to which electrode tabs of unit cells are electrically connected, is electrically connected to the bus bar 212 at one side of each of the battery modules 210(a) and 210(b). The bus bar 212 has a structure in which the battery modules 210(a) and 210(b) are protruded and bent upward. A silicate-containing inorganic sheet 250 is positioned between the top surface of the battery module 210 and the bent portion of the bus bar 212. The silicate-containing inorganic sheet 250 is specifically a mica sheet.

Specifically, the bus bar 212 is an inter bus bar that electrically connects adjacent battery modules 210(a) and 210(b), and the bus bar 212 has a structure connected by protruding and bending to the top of the frame of the battery modules 210(a) and 210(b). In addition, the present invention includes a silicate-containing inorganic sheet 250 positioned between the top surface of the battery module 210 and the bent portion of the bus bar 212, respectively.

Specifically, the silicate-containing inorganic sheet 250 has a groove formed in a "⊏" shape, and the protruding portion of the bus bar 212 is inserted into the groove so that the silicate-containing inorganic sheet 250 surrounds the bus bar 212. In the silicate-containing inorganic sheet, a region in which the groove is not formed may be attached on the module frame.

If any one of the battery modules housed in the battery pack is ignited, static electricity and sparks may occur because the potential difference between the potential applied from the ignited battery module to another battery module by the module frame and the potential applied to the bus bar through the high voltage terminal from the secondary battery inside the module is large. By attaching a silicate-containing inorganic sheet between the top surface of the battery module and the bent portion of the bus bar, insulation between the bus bar and the module case can be secured, fire spread can be blocked, and the safety of the battery module can be ensured.

In the above, the present invention has been described in more detail through the drawings. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS 10, 110(a), 110(b), 210(a), 210(b): battery module
11, 211: electrode lead
21, 121, 221: support bolt
122: slit
12, 112, 212: bus bar
20, 120, 220: vertical beam
30, 130: lead assembly
140: heat diffusion preventing member
141: vertical body
142: horizontal body
250: silicate-containing inorganic sheet

The invention claimed is:

1. A battery pack comprising:
a pack receiving portion including a plurality of compartments divided by a vertical beam, and having an open top surface;
a battery module accommodated in each compartment of the pack receiving portion;
a lead assembly covering a top surface of the pack receiving portion and having a slit formed in an area corresponding to an upper end of the vertical beam; and
a heat diffusion preventing member inserted into the slit of the lead assembly and mounted on the upper end of the vertical beam.

2. A battery pack of claim 1, wherein the heat diffusion preventing member comprises:
a vertical body mounted on the upper end of the vertical beam; and
a horizontal body formed on an upper end of the vertical body and formed with an area larger than the slit formed in the lead assembly.

3. The battery pack of claim 2, wherein the vertical body includes two plate-shaped members parallel to each other, and
wherein the upper end of the vertical beam is inserted between the two plate-shaped members.

4. The battery pack of claim 1, wherein a height of the vertical beam is in a range of 50 to 80% of a height of the battery module accommodated in the pack receiving portion, and
wherein the heat diffusion preventing member extends from the upper end of the vertical beam to shield a spaced distance to the lead assembly.

5. The battery pack of claim 1, wherein the heat diffusion preventing member is formed of a silicate-containing inorganic material.

6. A battery pack of claim 1, wherein the heat diffusion preventing member is formed of a component represented by a following formula chemical formula 1:

$$X_2Y_{4-6}Z_8O_{20}(OH,F)_4 \qquad \text{Chemical formula 1}$$

where, in the above chemical formula 1,
X is at least one of K, Na and Ca;
Y is at least one of Al, Mg and Fe; and
Z is at least one of Si and Al.

7. The battery pack of claim 5, wherein the heat diffusion preventing member is formed of a mica sheet.

8. The battery pack of claim 1, wherein each battery module comprises:
   a plurality of battery cells in which electrode tabs are oriented in one direction;
   a module frame in which the plurality of battery cells are accommodated; and
   a bus bar electrically connected to the electrode tabs and extending and protruding toward an external side of the module frame.

9. The battery pack of claim 8, wherein the battery module further comprises an electrode lead, and
   wherein a first end of the electrode lead is connected to the electrode tabs, and a second end is connected to the bus bar.

10. The battery pack of claim 8, wherein the bus bar has a bent portion extending over a top of the module frame, and
    wherein a silicate-containing inorganic sheet is positioned between a top surface of the battery module and the bent portion of the bus bar.

11. The battery pack of claim 8, wherein the bus bar is an inter bus bar that electrically connects adjacent battery modules.

12. The battery pack of claim 10, wherein the silicate-containing inorganic sheet is a mica sheet.

13. An automobile comprising the battery pack according to claim 1.

14. A power storage device comprising the battery pack according to claim 1.

* * * * *